United States Patent
Yao et al.

(10) Patent No.: US 11,339,819 B2
(45) Date of Patent: May 24, 2022

(54) LOCK CATCH, HEAT PRESERVATION PLATE ASSEMBLY AND REFRIGERATOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Jun Yao, Anhui (CN); Mingbo Jiang, Anhui (CN); Guoliang Zhu, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 371 days.

(21) Appl. No.: 16/472,040

(22) PCT Filed: Feb. 28, 2017

(86) PCT No.: PCT/CN2017/075236
§ 371 (c)(1),
(2) Date: Jun. 20, 2019

(87) PCT Pub. No.: WO2018/113092
PCT Pub. Date: Jun. 28, 2018

(65) Prior Publication Data
US 2020/0096247 A1    Mar. 26, 2020

(30) Foreign Application Priority Data

Dec. 21, 2016 (CN) .......................... 201611190827.9

(51) Int. Cl.
*F16B 12/20* (2006.01)
*F16B 12/10* (2006.01)

(52) U.S. Cl.
CPC .......... *F16B 12/2009* (2013.01); *F16B 12/10* (2013.01)

(58) Field of Classification Search
CPC .... F16B 5/0036; F16B 5/0088; F16B 5/0092; F16B 5/0621; F16B 12/10; F16B 12/2009;
(Continued)

(56) References Cited

U.S. PATENT DOCUMENTS 3,472,545 A * 10/1969 Berkowitz ............ E04B 1/6183
                                                    292/111
4,417,430 A * 11/1983 Loikitz ................. E04B 1/6183
                                                    292/111
(Continued)

FOREIGN PATENT DOCUMENTS

CN         1225424 A      8/1999
CN       102068360 A      5/2011
(Continued)

OTHER PUBLICATIONS

International Search Report, dated Sep. 15, 2017, for International Application No. PCT/CN2017/075236, 4 pages.

*Primary Examiner* — Josh Skroupa
(74) *Attorney, Agent, or Firm* — Seed IP Law Group LLP

(57) ABSTRACT

A lock catch comprises: a first lock catch portion, comprising: a first housing and a first connection portion arranged in the first housing; and a second lock catch portion, comprising: a second housing, a surface of the second housing
(Continued)

includes a first and second insert hole; a rotary draw-bar assembly arranged in the second housing and comprising a draw-bar and rotation portion arranged on the draw-bar, the rotation portion and the first insert hole arranged oppositely, one end of the draw-bar includes a second connection portion matching the first connection portion, another end of the draw-bar includes a fixed connection portion, and the second connection portion connected to the first connection portion by the rotation portion driving the draw-bar to rotate, and a fixed shaft, arranged in the second housing and opposite the second insert hole, the fixed shaft locked with the fixed connection portion by rotating a specified angle.

12 Claims, 7 Drawing Sheets

(58) Field of Classification Search
CPC .. F16B 12/2027; F16B 12/2036; F16B 12/32; F16B 2005/0671; F16B 2012/2018; F16B 2012/209; F25D 23/063; F25D 23/067; Y10T 403/591; Y10T 403/595; Y10T 403/597; Y10T 403/599; Y10T 403/608
USPC ...... 403/322.1, 322.4, 323, 325, 330; 70/84, 70/137
See application file for complete search history.

(56) References Cited

U.S. PATENT DOCUMENTS

| | | | | |
|---|---|---|---|---|
| 4,507,010 | A * | 3/1985 | Fujiya | ............... E04B 1/6183 403/322.1 |
| 6,299,224 | B1 * | 10/2001 | Finkelstein | ........... E04B 1/6183 292/240 |
| 6,679,646 | B2 | 1/2004 | Quardt et al. | |
| 9,803,403 | B2 * | 10/2017 | Finkelstein | ........... F16B 5/0092 |
| 9,863,143 | B2 * | 1/2018 | Finkelstein | ........... F25D 23/063 |
| 2018/0073797 | A1 * | 3/2018 | Taqi | ..................... F25D 23/087 |

FOREIGN PATENT DOCUMENTS

| | | | | |
|---|---|---|---|---|
| CN | 104329901 | A | 2/2015 | |
| CN | 205780149 | U | 12/2016 | |
| FR | 2571790 | A1 | 4/1986 | |
| FR | 2 927 677 | A3 | 8/2009 | |
| JP | 7-41020 | U | 7/1995 | |
| JP | 2003-27672 | A | 1/2003 | |
| KR | 10-1271387 | B1 | 6/2013 | |
| KR | 10-1470585 | B1 | 12/2014 | |
| KR | 10-2015-0044769 | A | 4/2015 | |
| NL | 1020433 | C1 | 10/2003 | |
| WO | WO-2014072723 | A2 * | 5/2014 | ............ F16B 5/0092 |
| WO | 2018113092 | A1 | 6/2018 | |

* cited by examiner

LOCK CATCH, HEAT PRESERVATION PLATE ASSEMBLY AND REFRIGERATOR

CROSS-REFERENCE TO RELATED APPLICATIONS

The present disclosure claims priority of Chinese Patent Application No. 201611190827.9, filed with the Chinese Patent Office on Dec. 21, 2016, and entitled "LOCK CATCH, HEAT PRESERVATION PLATE ASSEMBLY AND A REFRIGERATOR," which is incorporated herein by reference in its entirety.

TECHNICAL FIELD

The present disclosure relates to the field of household appliances, and in particular, to a lock catch, a heat preservation plate assembly, and a refrigerator.

BACKGROUND

In the related art, a refrigerator is produced by means of integral foaming. As the demand for customization continues to increase, a plurality of components including a heat preservation plate need to be assembled and modularized, and one of the most important components of the assembled module is a connection mechanism between the modules.

Therefore, how to design a lock catch that can firmly and securely connect various heat preservation plates of the refrigerator becomes an urgent problem to be solved.

BRIEF SUMMARY

One objective of the present disclosure is to provide a lock catch in order to solve at least one of the technical problems in the prior art or the related art.

Another objective of the present disclosure is to provide a heat preservation plate.

Another objective of the present disclosure is to provide a refrigerator.

In order to achieve one of the above objective, an embodiment of a first aspect of the present disclosure provides a lock catch, which comprises: a first lock catch portion comprising a first housing and a first connection portion arranged in the first housing; and a second lock catch portion, comprising: a second housing, a surface of the second housing being provided with a first insert hole and a second insert hole; a rotary draw-bar assembly arranged in the second housing, the rotary draw-bar assembly comprising a draw-bar and a rotation portion arranged on the draw-bar, the rotation portion and the first insert hole being arranged oppositely, one end of the draw-bar being provided with a second connection portion matching the first connection portion, the other end of the draw-bar being provided with a fixed connection portion, and the second connection portion being connected to the first connection portion by means of the rotation portion driving the draw-bar to rotate such that the first lock catch portion and the second lock catch portion are connected; and a fixed shaft, arranged in the second housing and arranged opposite the second insert hole, the fixed shaft being locked tightly and fixed with the fixed connection portion by rotating a specified angle such that the first lock catch portion is locked tightly and fixed with the second lock catch portion.

In this technical solution, the lock catch comprises a first lock catch portion and a second lock catch portion. The first lock catch portion comprises a first housing and a first connection portion fixedly arranged in the first housing. The second lock catch portion comprises a second housing, a rotary draw-bar assembly arranged in the second housing, and a fixed shaft. The rotary draw-bar assembly comprises a draw-bar and a rotation portion arranged on the draw-bar, the second housing opposite to the rotation portion is provided with a first insert hole, to control rotating of the rotation portion by means of the first insert hole, and rotating of the rotating portion drives the draw-bar to rotate around the center of the rotation portion. In addition, one end of the draw-bar is provided with a second connection portion, and the first connection portion and the second connection portion are connected by the rotation of the draw-bar. The other end of the draw-bar is further provided with a fixed connection portion, and after the first connection portion is connected with the second connection portion, the fixed shaft is fixedly connected with the fixed connection portion by rotating a specified angle, such that the first lock catch portion is locked tightly and fixed with the second lock catch portion. This further realizes the fixed connection between the module mounted with the first lock catch portion and the module mounted with the second lock catch portion, and the technical solution has the advantages of simple structure, convenient operation and reliable connection.

In addition, the lock catch in the above embodiment of the present disclosure may further have the following additional technical features.

In the above technical solution, preferably, the rotation portion is a rotating shaft, which is arranged in the second housing by being inserted into the first insert hole. The rotating shaft includes a sidewall of which is provided with a third insert hole. The draw-bar passing through the third insert hole positioning the rotation shaft to a specified position. The third insert hole of the rotating shaft forms a sleeve around the draw bar.

In this technical solution, the rotation portion is specifically provided as a rotating shaft, and a third insert hole is arranged in the horizontal direction through the rotation shaft. The draw-bar is inserted into the third insert hole, so that when the rotating shaft rotates, the horizontal rotation of the draw-bar can be driven. When the second connection portion is connected to the first connection portion, the first connection portion and the second connection portion cooperate with each other to realize the connection between the first lock catch portion and the second lock catch portion. Thus, it is convenient to install the lock catch, the operation is simple, and the connection and assembly needs of different structures can be satisfied.

In addition, the rotating shaft can be also provided with a longitudinal non-circular hole, and the corresponding draw-bar is also a non-cylindrical draw-bar, to prevent relative rotation between the rotating shaft and the draw-bar. Further, redundant space is provided between the non-circular hole and the non-cylindrical draw-bar, which enables the draw-bar to be slightly adjusted front and rear relative to the rotating shaft horizontally.

In any of the above technical solutions, preferably, a sidewall of the draw-bar is provided with a first limiting structure; a second limiting structure that cooperates with the first limiting structure is arranged in the third insert hole of the rotating portion or shaft; a third limiting structure is also arranged in the third insert hole; and an elastic buffer member is disposed between the first limiting structure and the third limiting structure.

In the technical solution, the side wall of the draw-bar is provided with a first limiting structure, and a second limiting structure is correspondingly arranged in the third insert hole, realizing the unidirectional limit in the direction of the draw-bar. Further, a third limiting structure is arranged in the third insert hole, realizing the bidirectional limit in the direction of the draw-bar. By adding an elastic buffer member between the first limiting structure and the third limiting structure, the draw-bar can be moved forward and backward relative to the rotating shaft in the range in which the elastic buffer member is allowed to deform. Thus, in the case that the first lock catch portion and the second lock catch portion have an assembly gap, the purpose of reducing the assembly gap is achieved by the movement of the draw-bar, satisfying the need to adjust the assembly gap between the first lock catch portion and the second lock catch portion, and further preventing the assembly gap from being generated after the interconnected modules are assembled.

In any of the above technical solutions, preferably, the elastic buffer member is a spring on the draw-bar or an elastic filler disposed in the third insert hole. The spring on the draw-bar forms a sleeve around a portion of the draw-bar.

In this technical solution, the elastic buffer member is provided as a spring on the draw-bar or an elastic filler disposed in the third insert hole. The spring on the draw-bar forms a sleeve around a portion of the draw-bar. On the one hand, the requirement for the limit of the rotating shaft can be satisfied. On the other hand, the elastic deformation of the spring or the elastic filler can meet the adjustment requirements when the draw-bar is required to move forward and backward.

In any of the above technical solutions, preferably, the second connection portion is a cylindrical plug; the fixed shaft is circumferentially provided with a notch portion to insert the cylindrical plug into the fixed shaft after the draw-bar is rotated; and the notch portion is provided with the first engaging surface, which matches the inner end surface of the cylindrical plug to realize the engagement of the draw-bar; the notch portion is further provided with a second engaging surface having a specified angle with the first engaging surface, and the fixed shaft is rotated by the specified angle such that the inner end surface is engaged with the second engaging surface, wherein the distance between the first engaging surface and the axis of the fixed shaft is greater than the distance between the second engaging surface and the axis of the fixed shaft to reduce the assembly gap between the first housing and the second housing by the rotation of the fixed shaft.

In this technical solution, the second connection portion is provided as a cylindrical plug, the plug diameter of the cylindrical plug is greater than that of an adjacent connection bar coupling the cylindrical plug to the draw-bar. By the rotation of the draw-bar, the cylindrical plug is inserted into the fixed shaft through a notch portion provided on the fixed shaft while the first connection portion is connected to the second connection portion. The notch portion is provided with the first engaging surface, which matches the inner end surface of the cylindrical plug to realize the fixing of the draw-bar. Thereby, the first lock catch portion is connected to the second lock catch portion in the first direction, it is convenient to operate, and the high reliability is achieved.

Specifically, the second lock catch portion is composed of the draw-bar, the spring, the rotating shaft, the fixed shaft and the second housing, wherein the spring is on the draw-bar and the spring forms a sleeve around the draw-bar, one end of the spring is fixed at the first limiting structure of the draw-bar, and its other end is fixed at the third limiting structure inside the rotating shaft. When the draw-bar is advanced to the second limiting structure towards the direction of the first connection portion, the stable state is reached, and the draw-bar can be moved within a certain distance.

Taking the foam heat preservation plate as an example, the two adjacent foam heat preservation plates are spliced together, so that the notches of the first lock catch portion and the second lock catch portion are aligned, and one end of the second lock catch portion is connected to the first connection portion of the first lock catch portion by rotating the rotating shaft by 90° in use, such that the connection between the first lock catch portion and the second lock catch portion is realized, and the cylindrical plug is caught in the notch portion of the fixed shaft.

In any of the above technical solutions, preferably, the notch portion is further provided with a second engaging surface perpendicular to the first engaging surface, and the fixed shaft is rotated by 90° such that the inner end surface is engaged with the second engaging surface, wherein the distance between the first engaging surface and the axis of the fixed shaft is greater than the distance between the second engaging surface and the axis of the fixed shaft, so as to reduce the assembly gap between the first housing and the second housing by means of rotating of the fixed shaft.

In this technical solution, the distance between the second engaging surface and the axis of the fixed shaft is set to be smaller than the distance between the first engaging surface and the axis of the fixed shaft by providing the second engaging surface perpendicular to the first engaging surface. The inner end surface of the cylindrical plug matches the second engaging surface by the directional rotation of the fixed shaft. Thus, the connection between the first lock catch portion and the second lock catch portion in the second direction is realized. Moreover, through the cooperation with the elastic buffer member, the gap between the first lock catch portion and the second lock catch portion is adjusted as the draw-bar is pushed towards the direction of the fixed shaft. This achieves the convenient operation and the simple structure, further improves the assembly precision and prevents assembly gap from being generated.

Specifically, as the rotating shaft is rotated by 90°, the cylindrical plug is clamped at a position in the first direction of the fixed shaft, and the distance of the first engaging surface to the axis of the fixed shaft is relatively large. After the fixed shaft is rotated by 90°, the cylindrical plug is fixed at the second engaging surface of the fixed shaft, and the distance of the second engaging surface to the axis of the fixed shaft is reduced, thereby achieving the tensioning effect.

In any of the above technical solutions, preferably, the engaging area of the second engaging surface is further provided with a contact surface matching the fillet surface of the head of the cylindrical plug, so as to achieve locking by the interference fit of the fillet surface of the head and the contact surface.

In this technical solution, the contact surface matching the fillet surface of the head of the cylindrical plug is arranged in the upper and lower regions of the second engaging surface, and locking of the fixed shaft and the draw-bar is further realized through the interference fit of the fillet surface of the head and the contact surface. Thus, the overall stability of the lock catch structure is improved.

In any of the above technical solutions, preferably, the upper end surface of the rotating shaft and the upper end surface of the fixed shaft are provided with a hexagonal axial hole, respectively.

In this technical solution, the upper end surface of the rotating shaft and the upper end surface of the fixed shaft are provided with the hexagonal axial hole, respectively, such that the rotation of the rotating shaft or the fixed shaft can be controlled by a universal hex wrench. Thus, the fixed connection between the lock catch portion and the second lock catch portion is achieved, the operation tool is simple, rotary draw-bar assembly is convenient to operate, and the processing cost of the rotary draw-bar assembly is low.

In any one of the above technical solutions, preferably, the surface of the first housing is provided with a fourth insert hole; the first connection portion is a fixed bar, which is disposed in the first housing by being inserted into the fourth insert hole; the second connection portion is a hook, which is hooked to the fixed bar, to realize the connection between the first lock catch portion and the second lock catch portion.

In this technical solution, a fourth insert hole is disposed on the surface of the first housing, and the first connection portion is provided as a fixed bar and the fixed bar is inserted into the fourth insert hole, to realize the fixed connection between the fixed bar and the first housing and form the first lock catch portion. The corresponding second connection portion is a hook. The hook can be at 90°, which is hooked to the fixed bar by the rotation of the draw-bar, to realize the connection between the first lock catch portion and the second lock catch portion. Thus, the structure is simple, the processing cost is low, and the structure and assembly is convenient and simple to operate.

Specifically, when the rotating shaft is rotated by 90°, the connection between the draw-bar and the fixed bar can be realized. The fixing and the tensioning between the first lock catch portion and the second lock catch portion can be realized by rotating the fixed shaft, thereby realizing the splicing and tensioning between the heat preservation plates. As the gap between the two heat preservation plates is reduced, the better splicing between the adjacent two heat preservation plates is achieved and the splicing gap is reduced.

In any one of the above technical solutions, preferably, the first connection portion is a slot; the second connection portion is a hook, which is inserted into the slot, to realize the connection between the first lock catch portion and the second lock catch portion.

In this technical solution, the first connection portion and the second connection portion are provided as the card slot and the hook, respectively, and the hook is inserted into the slot, to realize the connection. Therefore, the structure is simple, the utility is simple and versatile, and the stability is high.

An embodiment of the second aspect of the present disclosure provides a heat preservation plate assembly, comprising the lock catch of any of the above, the heat preservation plate assembly comprising: a first heat preservation plate, including a first upper casing, a first lower casing, and a first heat preservation layer in the middle which is provided with a first lock catch portion; a second heat preservation plate, including a second upper casing, a second lower casing and a second heat preservation layer in the middle, the second upper casing being provided with a first matching hole, the second heat preservation layer being provided with a second matching hole, and the second upper casing and the second heat preservation layer being matched and assembled with the second lock catch portion of the lock catch through the first matching hole and the second matching hole.

In the technical solution, the first lock catch portion and the second lock catch portion are disposed in the first heat preservation plate and the second heat preservation plate respectively, and the first lock catch portion is locked tightly and fastened with the second lock catch portion, realizing the splicing between the first heat preservation plate and the second heat preservation plate. Thus, the operation of the assembly is simple and the reliability of the assembly is high.

Specifically, the adjacent heat preservation plates need to be spliced, and the first heat preservation plate and the second heat preservation plate are two adjacent heat preservation plates, wherein the first heat preservation plate includes a first upper casing, a first lower casing, and a first lock catch portion, which are assembled into a closed space with a sealing material (such as a sponge), fixed by an external mold, and then injected with a foaming material (polyurethane). After the foaming material is cured, the outside of the first lock catch portion is covered by the foaming material, and only the outermost lock catch slot is exposed.

The second heat preservation plate is similar to the first heat preservation plate, and includes a second upper casing, a second lower casing, and a second lock catch portion. After the foaming process and cure, the position of the first insert hole and the position of the second insert hole are also exposed while the lock catch slot of the second lock catch portion is exposed.

An embodiment of the third aspect of the disclosure provides a refrigerator comprising the heat preservation plate assembly of any of the embodiments of the second aspect of the present disclosure.

The refrigerator provided by the embodiment of the third aspect of the present disclosure has all the beneficial effects of the above-mentioned heat preservation plate assembly because the refrigerator is provided with the heat preservation plate assembly of the second aspect of the present disclosure. However, the details of the refrigerator are not described herein.

Additional aspects and advantages of the present disclosure will be more apparent in the description below, or may be learned by the practice of the present disclosure.

BRIEF DESCRIPTION OF THE SEVERAL VIEWS OF THE DRAWINGS

The foregoing and/or additional aspects and advantages of the present disclosure will become apparent and understandable from the following description of the embodiments in conjunction with the accompanying drawings, wherein.

Figure 1:
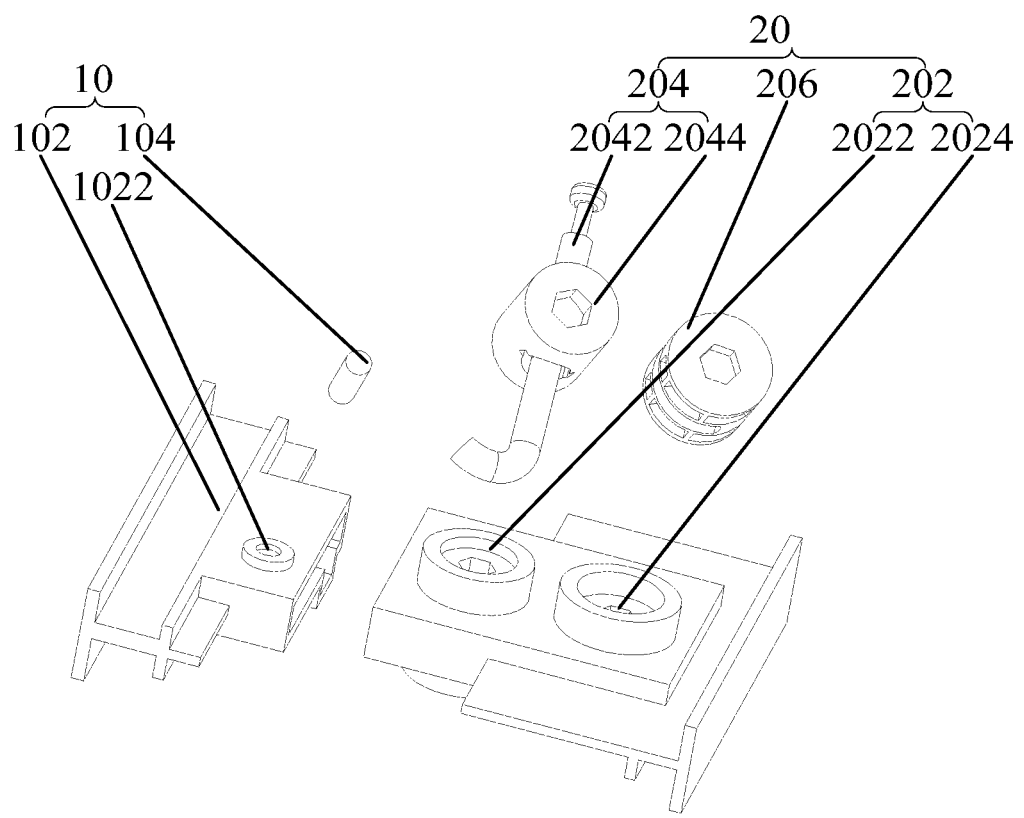
FIG. 1 shows a schematic exploded view of a structure of a lock catch according to an embodiment of the present disclosure.

Wherein, the correspondence between the reference numerals in FIG. 1 to FIG. 16 and the part names is:

first lock catch portion 10, first housing 102, first connection portion 104, second lock catch portion 20, second housing 202, first insert hole 2022, second insert hole 2024, rotary draw-bar assembly 204, draw-bar 2042, rotation portion 2044, second connection portion 2046, fixed connection portion 2048, fixed shaft 206, third insert hole 2044A, first limiting structure 2042A, second limiting structure 2044C, third limiting structure 2044B, elastic buffer member 2050, first engaging surface 2062, second engaging surface 2064, hexagonal axial hole 2066, fourth insert hole 1022, first heat preservation plate 1, first upper casing 12, first lower casing 14, first heat preservation layer 16, second heat preservation plate 2, second upper casing 22, second lower casing 24, second heat preservation layer 26.

DETAILED DESCRIPTION

In order that the above-mentioned objectives, features and advantages of the present disclosure can be understood more clearly, a further detailed description of the present disclosure will be given below in combination with the accompanying drawings and embodiments. It should be noted that, in the absence of a conflict, the embodiments of the present application and the features in the embodiments can be combined with each other.

A lot of specific details are set forth in the following description so as to fully understand the present disclosure, but the present disclosure may also be implemented in other ways other than those described herein, and thus the protection scope of the present disclosure is not limited to the specific embodiments disclosed below.

A lock catch in accordance with some embodiments of the present disclosure is described below with reference to FIGS. 1-13.

Figure 2:
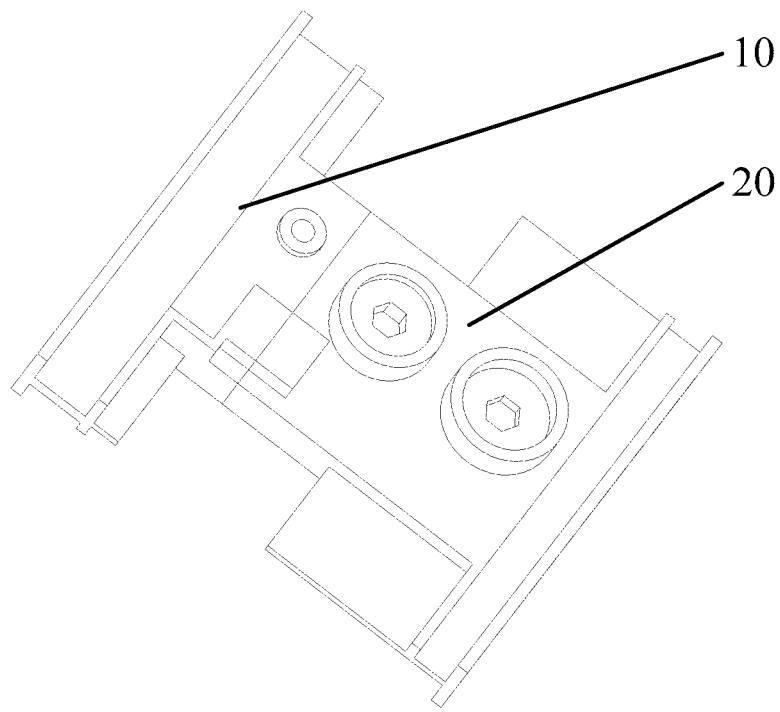
FIG. 2 shows a schematic view of the assembly of the lock catch in accordance with one embodiment of the present disclosure.

As shown in FIG. 1 and FIG. 2, the lock catch according to the embodiments of the present disclosure comprises: a first lock catch portion 10 comprising a first housing 102 and a first connection portion 104 arranged in the first housing 102; and a second lock catch portion 20, comprising: a second housing 202, a surface of the second housing 202 being provided with a first insert hole 2022 and a second insert hole 2024; a rotary draw-bar assembly 204 arranged in the second housing 202, the rotary draw-bar assembly 204 comprising a draw-bar 2042 and a rotation portion 2044 arranged on the draw-bar 2042, the rotation portion 2044 and the first insert hole 2022 being arranged oppositely, one end of the draw-bar 2042 being provided with a second connection portion 2046 matching the first connection portion 104, the other end of the draw-bar 2042 being provided with a fixed connection portion 2048, and the second connection portion 2046 being connected to the first connection portion 104 by means of the rotation portion 2044 driving the draw-bar 2042 to rotate such the first lock catch portion 10 and the second lock catch portion 20 are connected; and a fixed shaft 206, arranged in the second housing 202 and arranged opposite the second insert hole 2024, the fixed shaft 206 being locked tightly and fixed with the fixed connection portion 2048 by rotating a specified angle such that the first lock catch portion 10 is locked tightly and fixed with the second lock catch portion 20.

In this technical solution, the lock catch comprises a first lock catch portion 10 and a second lock catch portion 20. The first lock catch portion 10 comprises a first housing 102 and a first connection portion 104 fixedly arranged in the first housing 102. The second lock catch portion 20 comprises a second housing 202, a rotary draw-bar assembly 204 arranged in the second housing 202, and a fixed shaft 206. The rotary draw-bar assembly 204 comprises a draw-bar 2042 and a rotation portion 2044 arranged on the draw-bar 2042, the second housing 202 opposite to the rotation portion 2044 is provided with a first insert hole 2022, to control rotating of the rotation portion 2044 by means of the first insert hole 2022, and rotating of the rotating portion 2044 drives the draw-bar 2042 to rotate around the center of the rotation portion 2044. In addition, one end of the draw-bar 2042 is provided with a second connection portion 2046, and the first connection portion 104 and the second connection portion 2046 are connected by the rotation of the draw-bar 2042. The other end of the draw-bar 2042 is further provided with a fixed connection portion 2048, and after the first connection portion 104 is connected with the second connection portion 2046, the fixed shaft 206 is fixedly connected with the fixed connection portion 2048 by rotating a specified angle, such that the first lock catch portion 10 is locked tightly and fixed with the second lock catch portion 20. This further realizes the fixed connection between the module mounted with the first lock catch portion 10 and the module mounted with the second lock catch portion 20, and the technical solution has the advantages of simple structure, convenient operation and reliable connection.

In addition, the lock catch in the above embodiment of the present disclosure may further have the following additional technical features.

Figure 3:
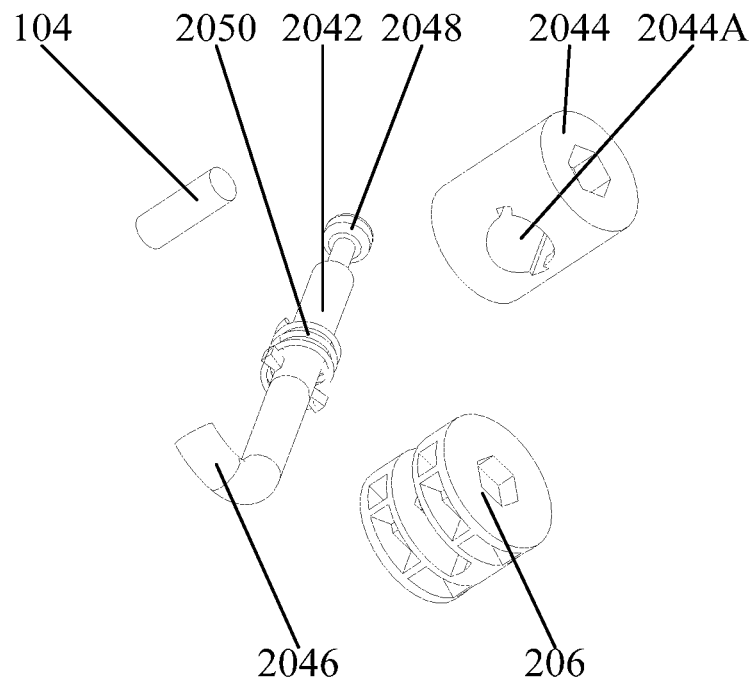
FIG. 3 is a schematic exploded view of the internal structure of the lock catch according to an embodiment of the present disclosure.
Figure 4:
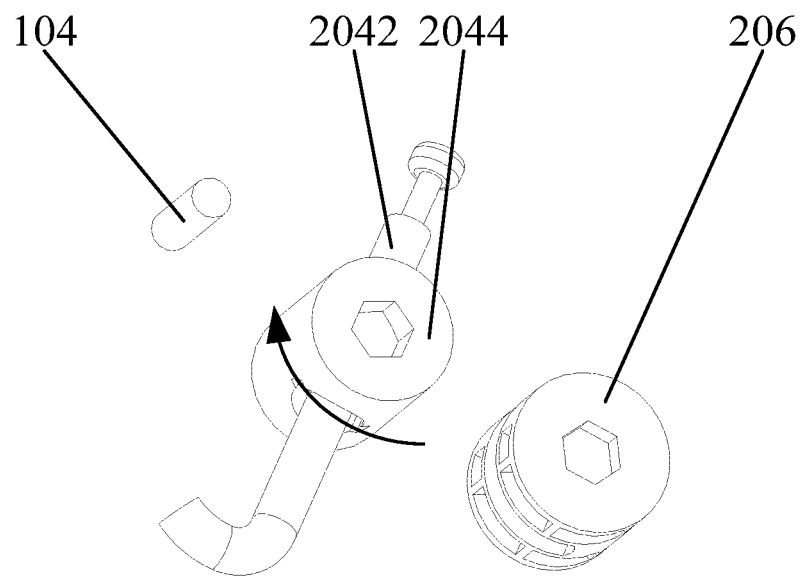
FIG. 4 is a schematic exploded view of the internal structure of a lock catch according to another embodiment of the present disclosure.
Figure 5:
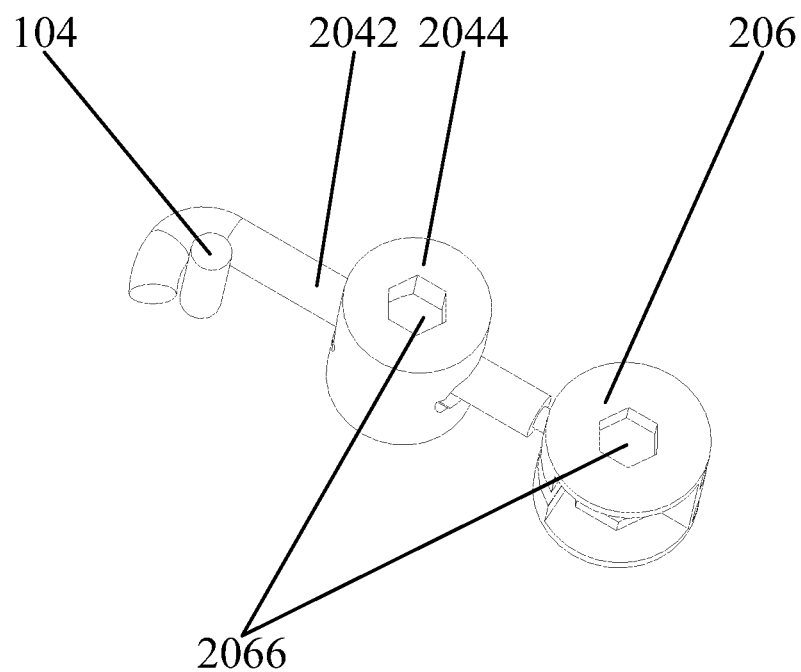
FIG. 5 is a schematic connection view showing the internal structure of the lock catch according to an embodiment of the present disclosure.
Figure 6:
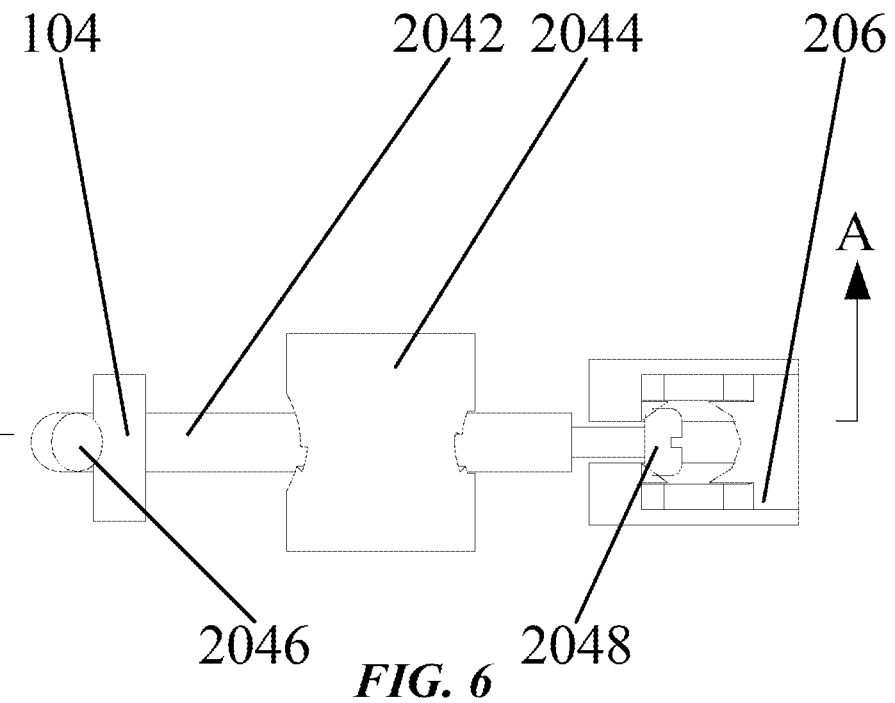
FIGS. 6 to 9 are schematic connection views showing the internal structure of the lock catch in a first direction according to an embodiment of the present disclosure.

As shown in FIGS. 3-5, in the above technical solution, preferably, the rotation portion 2044 is a rotating shaft, which is arranged in the second housing 202 by being inserting into the first insert hole 2022, and a sidewall of which is provided with a third insert hole 2044A, the rotating shaft being oriented in a specified position by the draw-bar 2042 passing through the third insert hole 2044A. The third insert hole 2044A is a sleeve that surrounds the draw-bar 2042.

In this technical solution, the rotation portion 2044 is specifically provided as a rotating shaft, and a third insert hole 2044A is arranged in the horizontal direction of the rotation shaft, to insert the draw-bar 2042 into the third insert hole 2044A, so that when the rotating shaft rotates, the horizontal rotation of the draw-bar 2042 can be driven. When the second connection portion 2046 is connected to the first connection portion 104, the first connection portion 104 and the second connection portion 2046 cooperate with each other to realize the connection between the first lock catch portion 10 and the second lock catch portion 20. Thus, it is convenient to install the lock catch, the operation is simple, and the connection and assembly needs of different structures can be satisfied.

In addition, the rotating shaft 2044 can also be provided with a longitudinal non-circular hole, and the corresponding draw-bar 2042 is also a non-cylindrical shape, to prevent relative rotation between the rotating shaft and the draw-bar 2042. Further, redundant space is provided between the non-circular hole and the non-cylindrical draw-bar 2042, which enables the draw-bar 2042 to be slightly adjusted front and rear relative to the rotating shaft horizontally.

Figure 7:
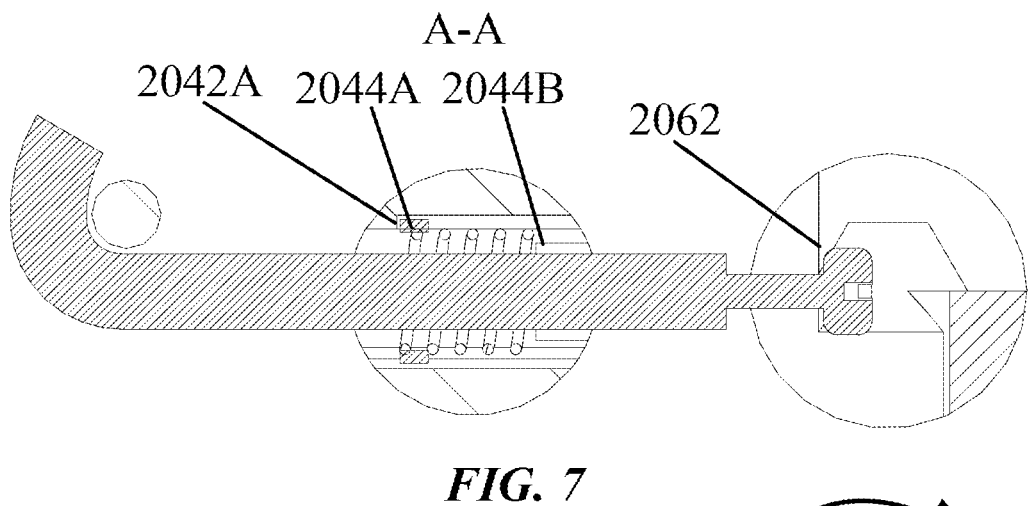
Figure 8:
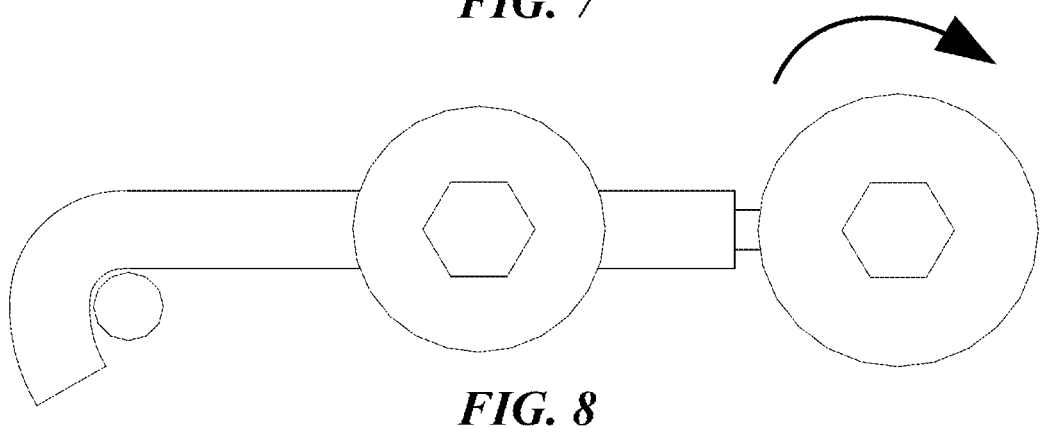
Figure 9:
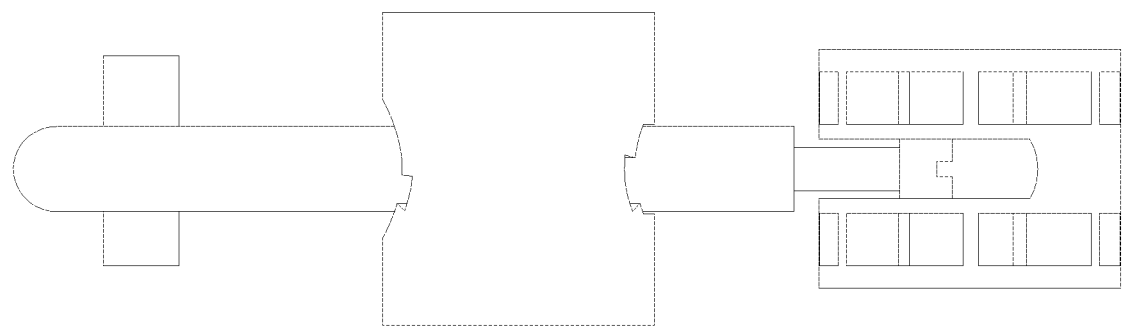
Figure 10:
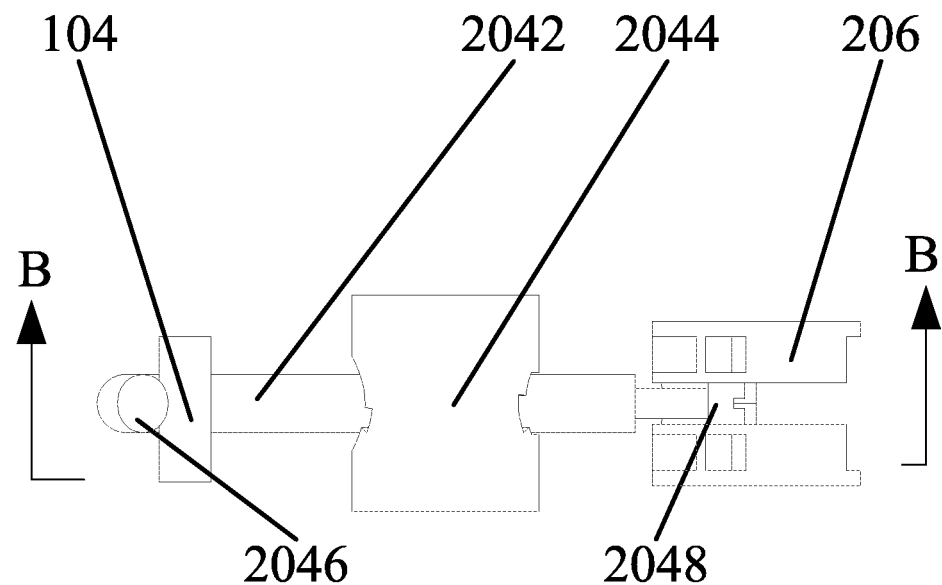
FIGS. 10 to 13 are schematic connection views showing the internal structure of the lock catch in a second direction according to an embodiment of the present disclosure.
Figure 11:
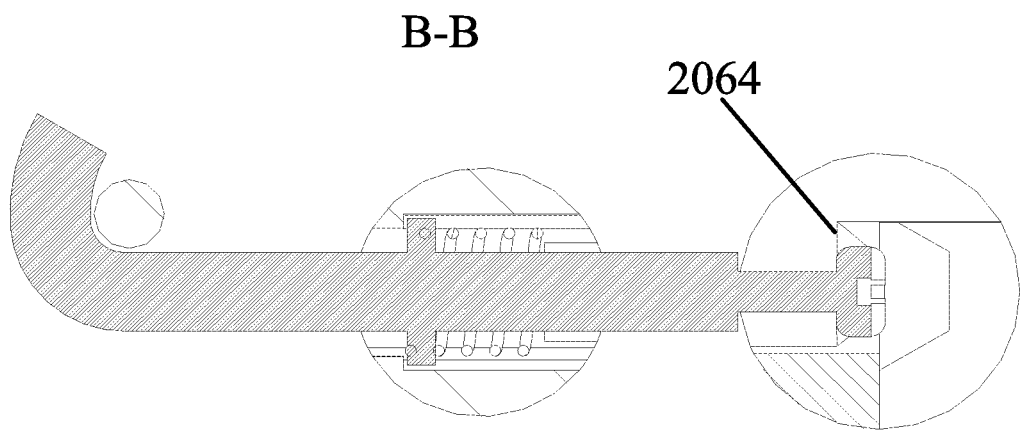
Figure 12:
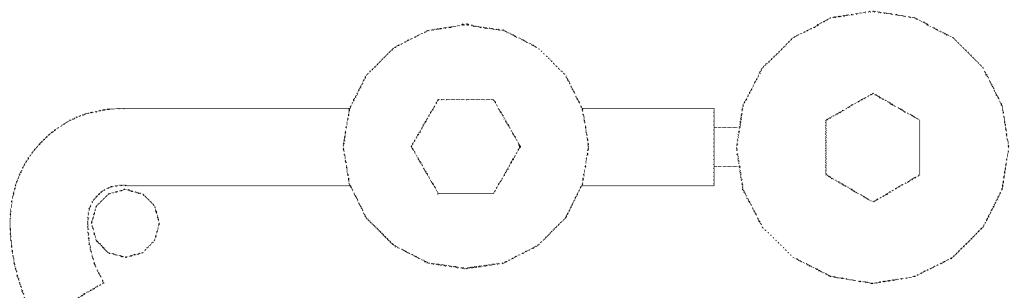
Figure 13:
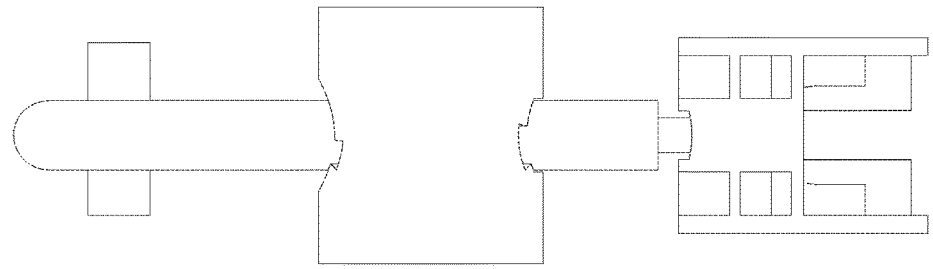
Figure 14:
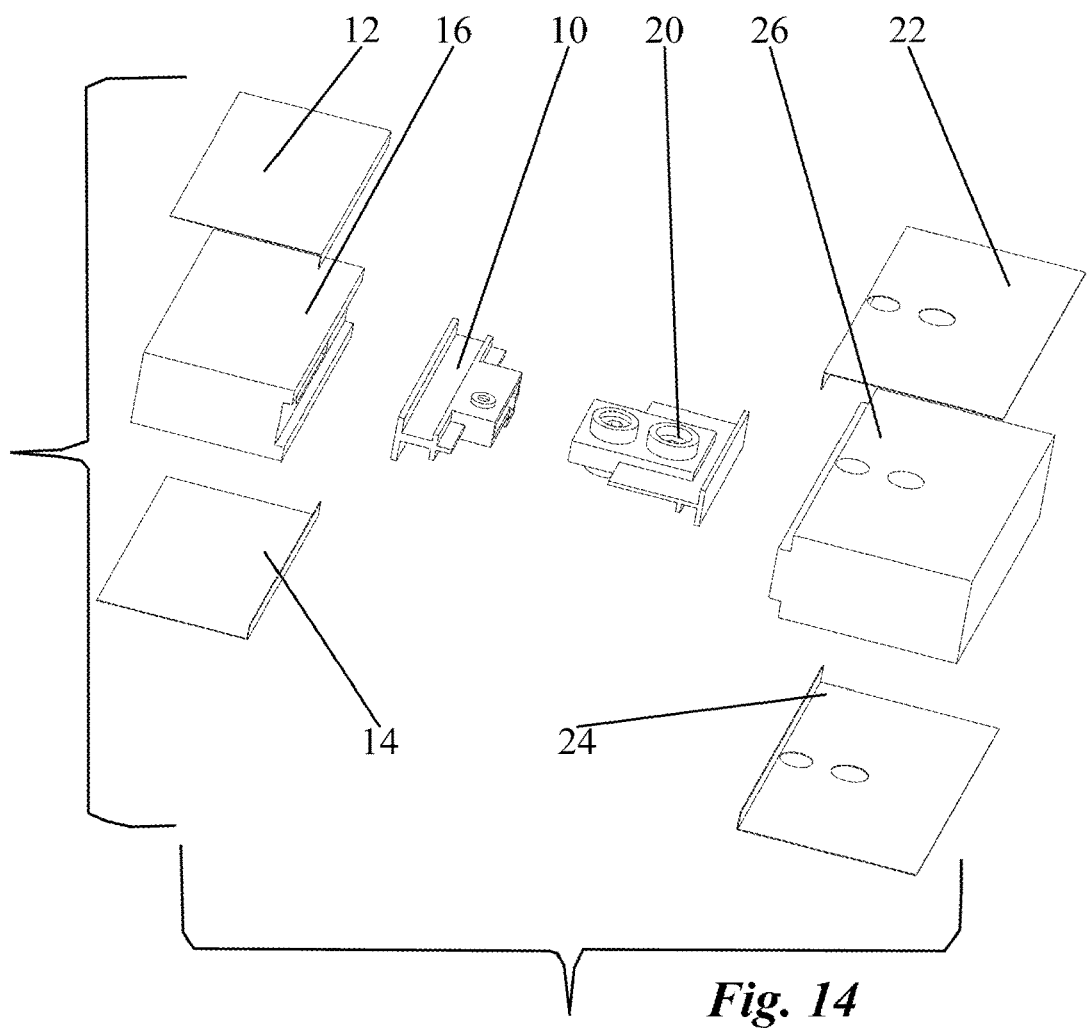
FIG. 14 is a schematic exploded view showing the structure of a heat preservation plate assembly in accordance with one embodiment of the present disclosure.
Figure 15:
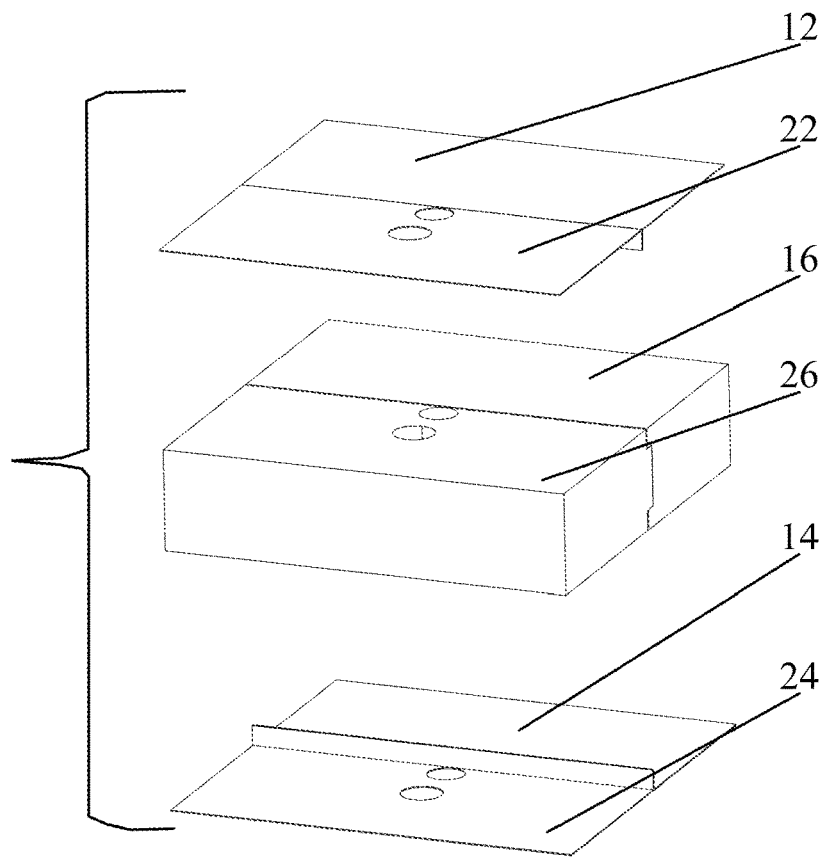
FIG. 15 is a schematic exploded view showing the structure of a heat preservation plate assembly according to another embodiment of the present disclosure.
Figure 16:
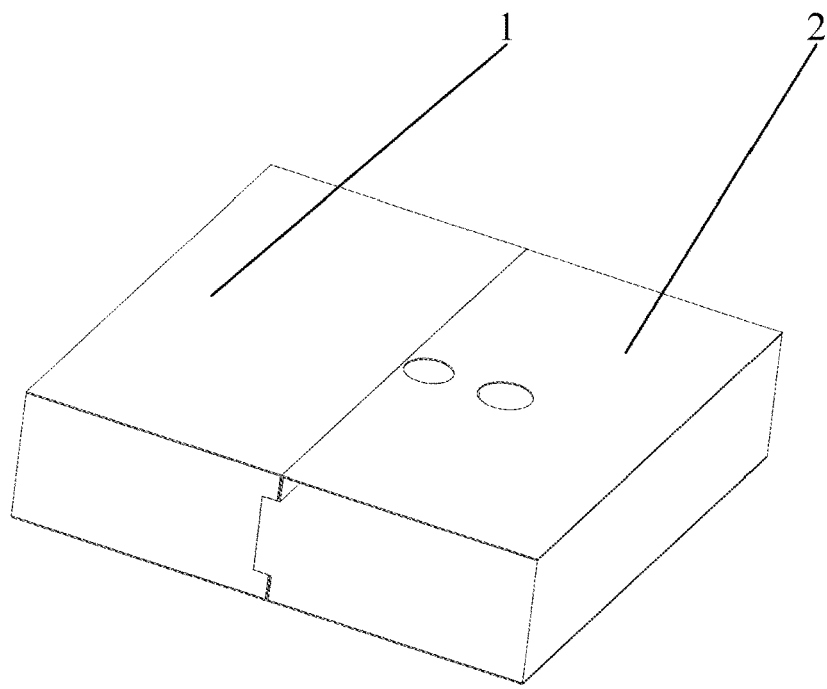
FIG. 16 shows a schematic view of the assembly of the heat preservation plate assembly in accordance with one embodiment of the present disclosure.

As shown in FIG. 7 and FIG. 11, in any of the above technical solutions, preferably, the sidewall of the draw-bar 2042 is provided with a first limiting structure 2042A; a second limiting structure 2044C that cooperates with the first limiting structure 2042A is arranged in the third insert hole 2044A; a third limiting structure 2044B is also arranged in the third insert hole 2044A; and an elastic buffer member 2050 is disposed between the first limiting structure 2042A and the third limiting structure 2044B.

In the technical solution, the side wall of the draw-bar 2042 is provided with a first limiting structure 2042A, and a second limiting structure 2044C is correspondingly arranged in the third insert hole 2044A, realizing the unidirectional limit in the direction of the draw-bar 2042. Further, a third limiting structure 2044B is arranged in the third insert hole 2044A, realizing the bidirectional limit in the direction of the draw-bar 2042. By adding an elastic buffer member 2050 between the first limiting structure 2042A and the third limiting structure 2044B, the draw-bar 2042 can be moved forward and backward relative to the rotating shaft in the range in which the elastic buffer member 2050 is allowed to deform. Thus, in the case that the first lock catch portion 10 and the second lock catch portion 20 have an assembly gap, the purpose of reducing the assembly gap is achieved by the movement of the draw-bar 2042, satisfying the need to adjust the assembly gap between the first lock catch portion 10 and the second lock catch portion 20, and further preventing the assembly gap from being generated after the interconnected modules are assembled.

In any of the above technical solutions, preferably, the elastic buffer member 2050 is a spring sleeved on the draw-bar 2042 or an elastic filler disposed in the third insert hole 2044A.

In this technical solution, the elastic buffer member 2050 is provided as a spring on the draw-bar 2042 or an elastic filler disposed in the third insert hole 2044A. The spring on the draw-bar 2042 surrounds a portion of the draw bar as a sleeve. On the one hand, the requirement for the limit of the rotating shaft can be satisfied. On the other hand, the elastic deformation of the spring or the elastic filler can meet the adjustment requirements when the draw-bar 2042 is required to move forward and backward.

As shown in FIGS. 3-13, in any of the above technical solutions, preferably, the second connection portion 2046 is a cylindrical plug; the fixed shaft 206 is circumferentially provided with a notch portion to insert the cylindrical plug into the fixed shaft 206 after the draw-bar 2042 is rotated; and the notch portion is provided with the first engaging surface 2062, which matches the inner end surface of the cylindrical plug to realize the engagement of the draw-bar 2042; the notch portion is further provided with a second engaging surface 2064 having a specified angle with the first engaging surface 2062, and the fixed shaft 206 is rotated by the specified angle such that the inner end surface is engaged with the second engaging surface 2064, wherein the distance between the first engaging surface 2062 and the axis of the fixed shaft 206 is greater than the distance between the second engaging surface 2064 and the axis of the fixed shaft 206 to reduce the assembly gap between the first housing 102 and the second housing 202 by the rotation of the fixed shaft 206.

In this technical solution, the second connection portion 2046 is provided as a cylindrical plug, the plug diameter of the cylindrical plug is greater than that of the adjacent connection bar. The adjacent connection bar couples the second connection portion 2046 provided as the cylindrical plug to the draw bar 2042. By the rotation of the draw-bar 2042, the cylindrical plug is inserted into the fixed shaft 206 through a notch portion provided on the fixed shaft 206 while the first connection portion 104 is connected to the second connection portion 2046. The notch portion is provided with the first engaging surface 2062, which matches the inner end surface of the cylindrical plug to realize the fixing of the draw-bar 2042. Thereby, the first lock catch portion 10 is connected to the second lock catch portion 20 in the first direction, it is convenient to operate, and the high reliability is achieved.

Specifically, the second lock catch portion 20 is composed of the draw-bar 2042, the spring, the rotation portion 2044 that is a rotating shaft, the fixed shaft 206 and the second housing 202, wherein the spring on and surrounds the draw-bar 2042 as a sleeve, one end of the spring is fixed at the first limiting structure 2042A of the draw-bar 2042, and its other end is fixed at the third limiting structure 2044B inside the rotating shaft. When the draw-bar 2042 is advanced to the second limiting structure 2044C towards the direction of the first connection portion 104, the stable state is reached, and the draw-bar 2042 can be moved within a certain distance.

Taking the foam heat preservation plate as an example, the two adjacent foam heat preservation plates are spliced together, so that the notches of the first lock catch portion 10 and the second lock catch portion 20 are aligned, and one end of the second lock catch portion 20 is connected to the first connection portion of the first lock catch portion 10 by rotating the rotating shaft by 90° in use, such that the connection between the first lock catch portion 10 and the second lock catch portion 20 is realized, and the cylindrical plug is caught in the notch portion of the fixed shaft 206.

In any of the above technical solutions, preferably, the notch portion is further provided with a second engaging surface 2064 perpendicular to the first engaging surface 2062, and the fixed shaft is rotated by 90° such that the inner end surface is engaged with the second engaging surface 2064, wherein the distance between the first engaging surface 2062 and the axis of the fixed shaft 206 is greater than the distance between the second engaging surface 2064 and the axis of the fixed shaft 206, so as to reduce the assembly gap between the first housing 102 and the second housing 202 by means of rotating of the fixed shaft 206.

As shown in FIG. 7 and FIG. 11, in this technical solution, the distance between the second engaging surface 2064 and the axis of the fixed shaft 206 is set to be smaller than the distance between the first engaging surface 2062 and the axis of the fixed shaft 206 by providing the second engaging surface 2064 perpendicular to the first engaging surface 2062. The inner end surface of the cylindrical plug matches the second engaging surface 2064 by the directional rotation of the fixed shaft 206. Thus, the connection between the first lock catch portion 10 and the second lock catch portion 20 in the second direction is realized. Moreover, through the cooperation with the elastic buffer member 2050, the gap between the first lock catch portion 10 and the second lock catch portion 20 is adjusted as the draw-bar 2042 is pushed towards the direction of the fixed shaft 206. This achieves the convenient operation and the simple structure, further improves the assembly precision and prevents assembly gap from being generated.

As shown in FIGS. 6-9, specifically, as the rotating shaft is rotated by 90°, the cylindrical plug is clamped at a position in the first direction of the fixed shaft 206, and the distance of the first engaging surface 2062 to the axis of the fixed shaft 206 is relatively large. After the fixed shaft 206 is rotated by 90°, the cylindrical plug is fixed at or in contact with the second engaging surface 2064 of the fixed shaft 206, and the distance of the second engaging surface 2064 to the axis of the fixed shaft 206 is reduced, thereby achieving the tensioning effect.

In any of the above technical solutions, preferably, the engaging area of the second engaging surface 2064 is further provided with a contact surface matching the fillet surface of the head of the cylindrical plug, so as to achieve locking by the interference fit of the fillet surface of the head and the contact surface.

In this technical solution, the contact surface matching the fillet surface of the head of the cylindrical plug is arranged in the upper and lower regions of the second engaging surface 2064, and locking of the fixed shaft 206 and the draw-bar 2042 is further realized through the interference fit of the fillet surface of the head and the contact surface. Thus, the overall stability of the lock catch structure is improved.

In any of the above technical solutions, preferably, the upper end surface of the rotating shaft and the upper end surface of the fixed shaft 206 are provided with a hexagonal axial hole 2066, respectively.

In this technical solution, the upper end surface of the rotating shaft and the upper end surface of the fixed shaft 206 are provided with the hexagonal axial hole 2066, respectively, such that the rotation of the rotating shaft or the fixed shaft 206 can be controlled by a universal hex wrench. Thus, the fixed connection between the lock catch portion 10 and the second lock catch portion 20 is achieved, the operation tool is simple, it is convenient to operate, and processing cost is low.

As shown in FIGS. 1-3, in any one of the above technical solutions, preferably, the surface of the first housing 102 is provided with a fourth insert hole 1022; the first connection portion 104 is a fixed bar, which is disposed in the first housing by being inserted into the fourth insert hole 1022; the second connection portion 2046 is a hook, which is hooked to the fixed bar, to realize the connection between the first lock catch portion 10 and the second lock catch portion 20.

In this technical solution, a fourth insert hole 1022 is disposed on the surface of the first housing 102, and the first connection portion 104 is provided as a fixed bar and the fixed bar is inserted into the fourth insert hole 1022, to realize the fixed connection between the fixed bar and the first housing 102 and form the first lock catch portion 10. The corresponding second connection portion 2046 is a hook. The hook can be at 90°, and is hooked to the fixed bar by the rotation of the draw-bar 2042, to realize the connection between the first lock catch portion 10 and the second lock catch portion 20. Thus, the structure is simple, the processing cost is low, and the structure is convenient and simple to operate.

Specifically, when the rotating shaft is rotated by 90° in the direction as shown in FIG. 4, the connection between the draw-bar 2042 and the fixed bar can be realized. The fixing and the tensioning between the first lock catch portion 10 and the second lock catch portion 20 can be realized by rotating the fixed shaft 206, thereby realizing the splicing and tensioning between the heat preservation plates. As the gap between the two heat preservation plates is reduced, the better splicing between the adjacent two heat preservation plates is achieved and the splicing gap is reduced.

In any one of the above technical solutions, preferably, the first connection portion 104 is a slot; the second connection portion 2046 is a hook, which is inserted into the slot, to realize the connection between the first lock catch portion and the second lock catch portion.

In this technical solution, the first connection portion 104 is provided as the slot and the second connection portion 2046 is provided as the hook, respectively, and the hook is inserted into the slot, to realize the connection. Therefore, the structure is simple, the utility is great and versatile, and the stability is higher.

As show in FIGS. 13-16, a heat preservation plate assembly in accordance with an embodiment of the second aspect of the present disclosure comprises the lock catch of any of the above, the heat preservation plate assembly comprising: a first heat preservation plate 1, including a first upper casing 12, a first lower casing 14, and a first heat preservation layer 16 in the middle which is provided with a first lock catch portion 10; a second heat preservation plate, including a second upper casing 22, a second lower casing 24 and a second heat preservation layer 26 in the middle, the second upper casing 22 being provided with a first matching hole, the second heat preservation layer 26 being provided with a second matching hole, and the second upper casing 22 and the second heat preservation layer 26 are matched and assembled with the second lock catch portion 20 of the lock catch through the first matching hole and the second matching hole.

In the technical solution, the first lock catch portion 10 and the second lock catch portion 20 are disposed in the first heat preservation plate 1 and the first heat preservation plate 1 respectively, and the second lock catch portion 20 is locked tightly and fastened with the second lock catch portion 20, realizing the splicing between the first heat preservation plate 1 and the second heat preservation plate 2. Thus, the operation tool is simple, it is convenient to operate, and the reliability is high.

Specifically, the adjacent heat preservation plates need to be spliced, and the first heat preservation plate 1 and the second heat preservation plate 2 are two adjacent heat preservation plates, wherein the first heat preservation plate 1 includes a first upper casing 12, a first lower casing 14, and a first lock catch portion 10, which are assembled into a closed space with a sealing material (such as a sponge), fixed by an external mold, and then injected with a foaming material (polyurethane). After the foaming material is cured, the outside of the first lock catch portion 10 is covered by the foaming material, and only the outermost lock catch slot is exposed.

The second heat preservation plate 2 is similar to the first heat preservation plate 1, and includes a second upper casing 22, a second lower casing 24, and a second lock catch portion 20. Through the foaming process, the position of the first insert hole 2022 and the position of the second insert hole 2042 are also exposed while the lock catch slot of the second lock catch portion 20 is exposed.

An embodiment of the third aspect of the disclosure provides a refrigerator comprising the heat preservation plate assembly of any of the embodiments of the second aspect of the present disclosure.

The refrigerator provided by the embodiment of the third aspect of the present disclosure has all the beneficial effects of the above-mentioned heat preservation plate assembly because of being provided with the heat preservation plate assembly of the second aspect of the present disclosure, and the details thereof are not described herein.

The present disclosure provides a lock catch, a heat preservation plate assembly and a refrigerator. The lock catch comprises: a first lock catch portion, comprising a first housing and a first connection portion arranged in the first housing; and a second lock catch portion, comprising: a second housing, a surface of the second housing being provided with a first insert hole and a second insert hole; a rotary draw-bar assembly arranged in the second housing, the rotary draw-bar assembly comprising a draw-bar and a rotation portion arranged on the draw-bar, the rotation portion and the first insert hole being arranged oppositely, one end of the draw-bar being provided with a second connection portion matching the first connection portion, the other end of the draw-bar being provided with a fixed connection portion, and the second connection portion being connected to the first connection portion by means of the rotation portion driving the draw-bar to rotate, and a fixed shaft, arranged in the second housing and arranged opposite the second insert hole, the fixed shaft being locked tightly and fixed with the fixed connection portion by rotating a specified angle. The technical solution has the advantage of simple structure, convenient operation, and reliable connection.

In the present disclosure, the terms "first" and "second" are used for the purpose of description only, and cannot be construed as indicating or implying relative importance; the term "plurality" means two or more unless otherwise clearly defined. The terms "installation," "connected," "connection," "fixing" and the like should be understood broadly. For example, the "connection" may be a fixed connection, a detachable connection, or an integral connection; the "connected" can be directly connected or indirectly connected through an intermediary medium. Those of ordinary skill in the art can understand the specific meanings of the above terms in the present disclosure according to specific conditions.

In the description of the specification, it should be understood that the orientations or positional relationships indicated by the terms "upper," "lower," "front," "rear," "left," "right" and the like are orientations or positional relationships shown in the drawings, merely for facilitating to the description of the present disclosure and the simplification of the description. It is not intended to indicate or imply that the referred devices or units must have specific orientations, are constructed and operated in specific orientations, and therefore cannot be construed as limitation to the present disclosure.

In the description of the present specification, the description by the terms "one embodiment," "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

The foregoing descriptions are merely preferred embodiments of the present disclosure, and are not intended to limit the present disclosure, and various changes and modifications may be made by those skilled in the art. Any modifications, equivalent substitutions, improvements and the like made within the spirit and principle of the present disclosure shall fall within the protection scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A lock catch, which comprises:
   a first lock catch portion comprising a first housing and a first connection portion arranged in the first housing; and
   a second lock catch portion, comprising:
      a second housing, a surface of the second housing being provided with a first insert hole and a second insert hole;
      a rotary draw-bar assembly arranged in the second housing, the rotary draw-bar assembly comprising a draw-bar and a rotation portion arranged on the draw-bar, the rotation portion and the first insert hole being arranged oppositely, one end of the draw-bar being provided with a second connection portion matching the first connection portion, the other end of the draw-bar being provided with a fixed connection portion, and the second connection portion being connected to the first connection portion by means of the rotation portion driving the draw-bar to rotate such the first lock catch portion and the second lock catch portion are connected; and
      a fixed shaft, arranged in the second housing and arranged opposite the second insert hole, the fixed shaft being locked tightly and fixed with the fixed connection portion by rotating a specified angle such that the first lock catch portion is locked tightly and fixed with the second lock catch portion.

2. The lock catch of claim 1, wherein the rotation portion is a rotating shaft, which is arranged in the second housing by being inserting into the first insert hole, and a sidewall of the rotating shaft is provided with a third insert hole, the rotating shaft being on the draw-bar at a specified position of the draw-bar, the draw-bar passing through the third insert hole.

3. The lock catch of claim 2, wherein
   a sidewall of the draw-bar is provided with a first limiting structure;
   a second limiting structure that cooperates with the first limiting structure is arranged in the third insert hole;
   a third limiting structure is also arranged in the third insert hole; and
   an elastic buffer member is disposed between the first limiting structure and the third limiting structure.

4. The lock catch of claim 3, wherein the elastic buffer member is a spring on and around the draw-bar or an elastic filler disposed in the third insert hole.

5. The lock catch of claim 4, wherein
   the second connection portion is a cylindrical plug;
   the fixed shaft is circumferentially provided with a notch portion to insert the cylindrical plug into the fixed shaft after the draw-bar is rotated; and the notch portion is provided with the first engaging surface, which matches the inner end surface of the cylindrical plug to realize the engagement of the drawbar.

6. The lock catch of claim 5, wherein
the notch portion is further provided with a second engaging surface having a specified angle with the first engaging surface, and the fixed shaft is rotated by the specified angle such that the inner end surface is engaged with the second engaging surface,
wherein a first distance between the first engaging surface and the axis of the fixed shaft is greater than a second distance between the second engaging surface and the axis of the fixed shaft to reduce the assembly gap between the first housing and the second housing by the rotation of the fixed shaft.

7. The lock catch of claim 6, wherein the engaging area of the second engaging surface is further provided with a contact surface matching a fillet surface of the head of the cylindrical plug, so as to achieve locking by an interference fit of the fillet surface of the head and the contact surface.

8. The lock catch of claim 7, wherein the upper end surface of the rotating shaft and the upper end surface of the fixed shaft are provided with a hexagonal axial hole, respectively.

9. The lock catch of claim 1, wherein
the surface of the first housing is provided with a fourth insert hole;
the first connection portion is a fixed bar, which is disposed in the first housing by being inserted into the fourth insert hole;
the second connection portion is a hook, which is hooked to the fixed bar, to realize the connection between the first lock catch portion and the second lock catch portion.

10. The lock catch of claim 1, wherein
the first connection portion is a slot;
the second connection portion is a hook, which is inserted into the slot, to realize the connection between the first lock catch portion and the second lock catch portion.

11. A heat preservation plate assembly, comprising:
the lock catch of claim 1;
a first heat preservation plate, including a first upper casing, a first lower casing, and a first heat preservation layer in the middle which is provided with a first lock catch portion of the lock catch;
a second heat preservation plate, including a second upper casing, a second lower casing and a second heat preservation layer in the middle, the second upper casing being provided with a first matching hole, the second heat preservation layer being provided with a second matching hole, and the second upper casing and the second heat preservation layer being matched and assembled with the second lock catch portion of the lock catch through the first matching hole and the second matching hole.

12. A refrigerator comprising the heat preservation plate assembly of claim 11.

* * * * *